United States Patent

Farmer

[15] 3,704,053
[45] Nov. 28, 1972

[54] ELECTROSTATIC SPATIAL FILTER FOR A HIGH POWER LASER

[72] Inventor: William M. Farmer, Tullahoma, Tenn.

[73] Assignee: The United States of America as represented by the Secretary of the Air Force

[22] Filed: Dec. 10, 1970

[21] Appl. No.: 96,819

[52] U.S. Cl. ........................................ 350/17, 62/3
[51] Int. Cl. ........................... G02b 9/00, F25b 21/02
[58] Field of Search ............. 350/17; 331/94.5; 62/34

[56] References Cited

UNITED STATES PATENTS 3,415,587   12/1968   Cathey ........................ 350/3.5
3,451,755    6/1969   Silverman et al. .......... 356/102
3,224,497   12/1965   Blomgren et al. ............. 62/3 X
3,578,846    5/1971   Chen ..................... 350/162 SF Primary Examiner—David H. Rubin
Attorney—Harry A. Herbert, Jr. and George Fine

[57] ABSTRACT

An electrostatically cooled spatial filter for high powered pulsed lasers wherein the filter comprises a first lens which focuses a laser beam on a pinhole, and a second lens positioned behind the pinhole to receive the beam. To prevent the laser beam from destroying the pinhole an electric field is applied across the pinhole. This field cools the pinhole and as a result the size of the pinhole is preserved.

2 Claims, 1 Drawing Figure

PATENTED NOV 28 1972　　　　3,704,053
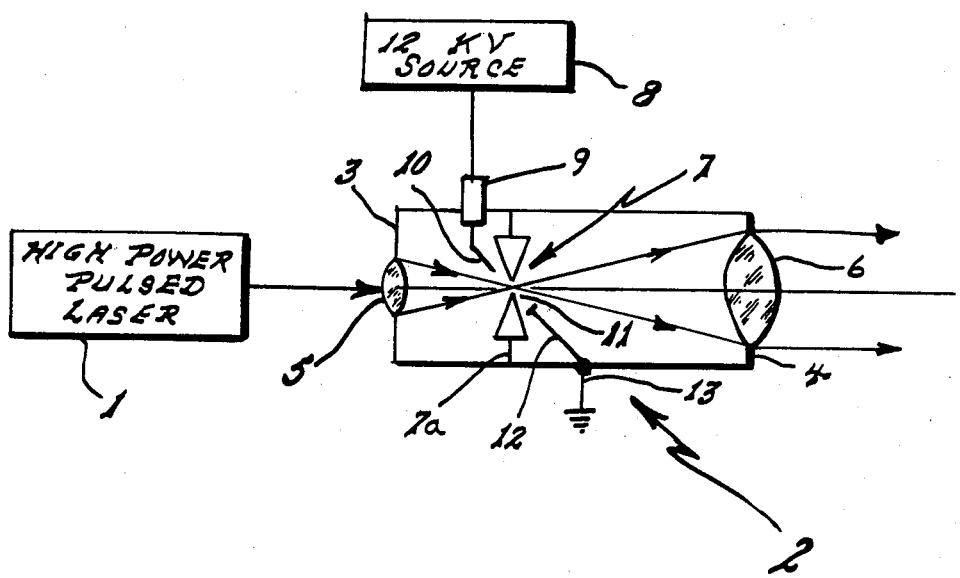
INVENTOR.
WILLIAM M. FARMER
BY Harry A. Herbert Jr
George Fine
ATTORNEYS

ELECTROSTATIC SPATIAL FILTER FOR A HIGH POWER LASER

BACKGROUND OF THE INVENTION

This invention relates to a filter for a laser, and more particularly, to an electrostatically cooled spatial filter for a high power pulsed laser.

A commonly used device on lower power CW lasers is a pinhole spatial filter and beam expander. The reason for using such a device is to eliminate the degrading effects of dust and scratches on the optical elements in the laser system and lenses. Physically, the spatial filter consists of a small positive lens which focuses the laser beam to a small hole, 10 $\mu$m–25 $\mu$m in diameter; the expanded laser beam is then collimated with a second lens to produce an enlarged beam of spatially filtered light. U.S. Pat. Nos. 3,415,587 and 3,451,755 both disclose the use of spatial filters with a laser beam. However, these filters are of the conventional type and do not include an electric field across the pinhole.

Heretofore, it has been impossible to use such a device with high powered pulsed lasers due to the fact that the light power in such lasers destroys the pinhole when focused on it. The present invention alleviates this problem and has unusual possibilities in laser drilling control.

SUMMARY OF THE INVENTION

An electrostatically cooled spatial filter for high power pulsed lasers is provided. The spatial filter is comprised of a small positive lens which focuses the laser beam to a small hole such as a pinhole. The expanded laser beam is then collimated with a second lens to produce an enlarged beam of spatially filter light. By using the proper material for the pinhole, high electric fields are utilized to cool the pinhole and keep the laser from destroying it. The material found most useful for this purpose is aluminum (Al) foil.

An object of this invention is to provide an electrostatically cooled spatial filter for high powered pulsed lasers.

Another object of this invention is to provide a pinhole spatial filter of lasers in which high electric fields are utilized to cool the pinhole.

Yet another object of this invention is to provide a pinhole spatial filter for lasers in which the pinhole is made by pulsing the lasers and producing a pinhole in a metal material with no applied potential and thereafter applying a potential to create a high electric field across the pinhole.

DESCRIPTION OF DRAWING

A single FIGURE is shown illustrating the preferred embodiment of the electrostatically cooled spatial filter for a high power pulsed laser.

DESCRIPTION OF PREFERRED EMBODIMENT

Now referring in detail to the single figure of the present invention, there is shown conventional high power pulsed laser 1. Cylindrical tube 2 having ends 3 and 4 are provided. Positive lens 5 and positive lens 6 are pressure fitted into ends 3 and 4 respectively. Metal material such as aluminum foil is positioned inside of cylindrical tube 3 by member 7a and it becomes pinhole 7. 12 kilovolt source 8 has connected thereto needle probe 9. Needle probe 9 includes needle 10. Needle probe 9 is also pressure fitted into cylindrical tube 2 in such fashion as to place needle 10 in any desired position. Metal plate 11 is fixed in position by rigid metal wire 12 which is affixed to cylindrical tube 2. Metal wire 12 is connected to ground by way of line 13.

In the operation of the preferred embodiment, small positive lens 5 focuses the laser output from high powered pulsed laser to a small hole in pinhole 7. The expanded laser beam is then collimated with positive lens 6 to produce an enlarged beam of spatially filtered light. Simultaneously, a 12 kilovolt potential is applied to needle probe 9 and needle 10. Plate 11 is ground with respect to the probe thereby providing high electric fields to cool pinhole 7 and keep the laser from destroying it.

It is noted that the spatial filter is made by pulsing the laser and producing a pinhole with no applied potential. Thereafter, the potential is applied and the initial pinhole size preserved.

With this method of spatially filtering high power pulsed laser beams, collimated beams of light of high intensity and spatial purity may be produced. Such beams will enhance the quality of holograms requiring pulsed laser light for formation and should simplify many holographic procedures used heretofore.

I claim:

1. An electrostatically cooled spatial filter for high power pulsed lasers comprising a pulsed high power laser, a thin metal pinhole member having a pinhole therethrough of a predetermined size, a first lens for focusing the pulsed output beam from said high power pulsed laser to said pinhole to provide an expanded laser beam, a second lens to collimate said expanded laser beam to produce an enlarged beam of spatially filtered light, and means to simultaneously generate exclusively high electric fields on either side and across said pinhole to cool said pinhole to preserve and retain said predetermined size of said hole, said means to generate high electric fields consisting of a kilovolt source, a needle probe connected thereto, said needle probe being positioned adjacent to said pinhole member and on one side thereof, a metal plate also positioned adjacent to said pinhole member and on the other side thereof, and means to ground said metal plate with respect to said needle probe, said needle probe and said metal plate being offset from the pinhole axis and aligned with each other through said pinhole.

2. An electrostatically cooled spatial filter as described in claim 1 wherein said pinhole member consists of aluminum foil.

* * * * *